United States Patent
Vasquez

(10) Patent No.: US 6,563,544 B1
(45) Date of Patent: May 13, 2003

(54) COMBINED VERTICAL FILTER FOR GRAPHIC DISPLAYS

(75) Inventor: Maximino Vasquez, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/393,480

(22) Filed: Sep. 10, 1999

(51) Int. Cl.[7] .............................................. H04N 11/20
(52) U.S. Cl. ....................... 348/447; 348/446; 348/607; 348/910
(58) Field of Search ................................ 348/447, 607, 348/618, 619, 622, 910, 446, 581; 382/260, 264; H04N 11/20, 5/21, 5/213

(56) References Cited

U.S. PATENT DOCUMENTS

| | | | |
|---|---|---|---|
| 4,233,601 A | 11/1980 | Hankins et al. ............. | 340/703 |
| 4,385,293 A | 5/1983 | Wisnieff ..................... | 340/793 |
| 4,739,313 A | 4/1988 | Oudshoorn et al. ......... | 340/703 |
| 4,766,427 A | 8/1988 | Abe et al. ................... | 340/721 |
| 5,422,654 A | 6/1995 | Tjandrasuwita et al. .... | 345/103 |
| 5,914,753 A * | 6/1999 | Donovan ..................... | 348/441 |
| 6,061,094 A * | 5/2000 | Maietta ....................... | 348/446 |
| 6,067,120 A * | 5/2000 | Horikawa et al. ........... | 348/447 |
| 6,094,226 A * | 7/2000 | Ke et al. ..................... | 348/446 |
| 6,281,933 B1 * | 8/2001 | Ritter .......................... | 348/447 |
| 6,320,619 B1 * | 11/2001 | Jiang .......................... | 348/447 |

* cited by examiner

Primary Examiner—John Miller
Assistant Examiner—Trang U. Tran
(74) Attorney, Agent, or Firm—Thelen Reid & Priest LLP; David B. Ritchie

(57) ABSTRACT

An apparatus and method for converting computer graphics images into a format suitable for display on a TV. A flicker filter is combined with a vertical scaling filter and/or vertical overscan compensation filter to produce an interlaced image formatted for display on a TV, more efficiently than if the processes occurred sequentially. The apparatus and method are not limited to any particular filter sizes or set of filter coefficient values. The apparatus and method may be used as part of a multimedia computer system.

25 Claims, 5 Drawing Sheets

COMBINED VERTICAL FILTER FOR GRAPHIC DISPLAYS

BACKGROUND OF THE INVENTION

1. Field of the Invention

The present invention relates to video displays. More particularly, the present invention relates to a combined vertical filter for processing computer graphic images.

2. The Background Art

A desirable feature for a multimedia computer system is the ability to display computer graphics on a standard television (TV) screen. However, the format and characteristics of the two systems differ. Some of the differences are listed in Table 1.

TABLE 1

| Computer Graphics | TV |
| --- | --- |
| Noninterlaced | Interlaced |
| Display Entire Frame | Overscan |
| High Vertical Frequency is Common | Low Vertical Frequency |
| Multiple Resolution | Fixed Resolution |
| RGB 444 Format | YUV 422 Format |

Omitted from Table 1, and this disclosure, are details particular to the various formats of TV such as National Television Standards Committee (NTSC), Phase Alternative Line (PAL) and Sequential Couleur Avec Mémoire (SECAM). Those of ordinary skill in the art are familiar with conversions between the various TV formats and the present invention is not intended to be limited to use with any particular format.

Computer graphics images are typically noninterlaced. That is, the entire frame is stored, and displayed, line-by-line from top to bottom. The process repeats and the entire frame is re-scanned at a given refresh rate, for example 75 Hz. In contrast, TV formats typically use two interlaced fields to store and display an image. Each of the two frames contains every other line of the image, such as one with the even numbered lines and the other with the odd. The two fields are consecutively scanned, so that the viewer perceives the resulting image as a blend of the two individual fields. The technique of interlacing was originally developed, in the early days of television, to present a pleasing graphic image while allowing a lower data transfer rate than needed to update the entire image with each scan. Although modern computer systems are not constrained by data transfer rates to the same extent as were early TV systems, interlaced display formats for TV are unlikely to disappear soon.

Overscan is also a remnant of early systems that is now firmly embedded in TV formats. Because it was costly to build TV picture tubes that accurately displayed an image along the outside border, overscan was developed to hide the image border. Typically, 10% to 20% of the image is cropped, or not displayed. For example, the NTSC format contains 486 active horizontal lines per frame but only approximately 430 lines are visible on a TV. Overscan compensation, which makes these hidden lines visible, may be needed when displaying computer graphics on a TV. For example, the "Start" icon displayed in Microsoft® Windows® that typically appears in the lower left corner of the computer monitor may be outside the displayed area of a TV screen without overscan compensation.

Computer graphics often contain images with high vertical frequency. That is, adjacent horizontal lines may have a high contrast, such as a light rectangular window displayed on a dark background. High vertical frequency is less common in "natural images" created for display on a TV. High vertical frequency may lead to a "flicker" effect when the image is displayed in an interlaced format on a TV. The flicker effect is caused by the location of the horizontal edge shifting slightly as the two interlaced fields, the even lines and the odd lines, are consecutively scanned. The present invention uses a flicker filter to reduce this effect. Most TV displays do not include a flicker filter.

Another issue when displaying computer graphics on a TV is that of the multiple resolutions often used in computer displays and the fixed resolution of a given TV display format. That is, a computer system may be capable of generating, and displaying graphic images in multiple resolution, such as 640×480, 800×600, 1024×768 and 1280× 960. However, a TV display format is typically defined around a single resolution such as the 486 active horizontal lines used by the NTSC format. In order to display a wide range of computer graphic images on a TV, a multimedia computer system would preferably not be limited to any one image resolution.

The present invention is directed at noninterlaced to interlaced conversion, vertical overscan compensation, vertical scaling, filtering high vertical frequency images and accepting computer graphic images in a variety of resolutions for display on a TV. While there are prior art techniques for individually performing these processes, the present invention efficiently combines the processes.

The last line of Table 1 describes two different color space formats that may be used by computer graphics and TV. These formats are well known to those of ordinary skill in the art, as are the formulas for converting between RGB and YUV color spaces. This conversion is not done by the present invention, although, the present invention may be used in conjunction with hardware or software that performs such a conversion. The present invention may be used with computer graphics using either RGB or YUV color spaces.

SUMMARY OF THE INVENTION

An apparatus and method for converting computer graphics images into a format suitable for display on a TV. A flicker filter is combined with a vertical scaling filter and/or vertical overscan compensation filter to produce an interlaced image formatted for display on a TV, more efficiently than if the processes occurred sequentially. The apparatus and method are not limited to any particular filter sizes or set of filter coefficient values. The apparatus and method may be used as part of a multimedia computer system.

DETAILED DESCRIPTION OF A PREFERRED EMBODIMENT

Figure 1:
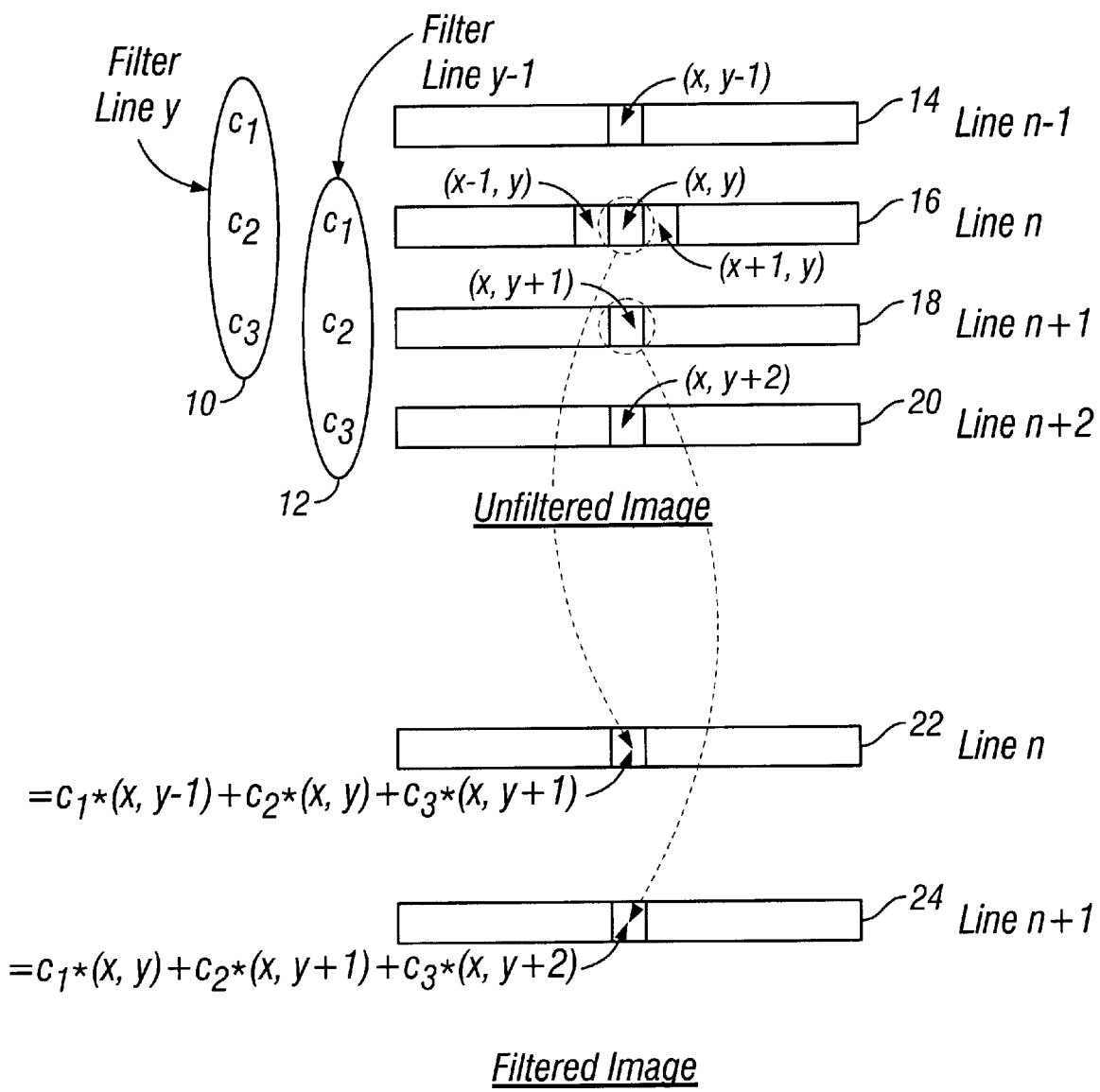
FIG. 1 is a diagram depicting the filtering of an image with a 3-tap filter.

Those of ordinary skill in the art will realize that the following description of the present invention is illustrative only and not in any way limiting. Other embodiments of the invention will readily suggest themselves to such skilled persons having the benefit of this disclosure.

The present invention converts computer graphic images into a format suitable for display on a standard television (TV) screen. It combines the processes of converting from noninterlaced to interlaced formats, vertical overscan compensation, flicker filtering and vertically scaling the size of an image. By combining these processes, the number of line buffers (memory) required, as well as the number of mathematical operations, are reduced compared to performing the operations separately. The invention thus allows the operations to be performed cheaper and faster. Alternatively, more sophisticated filtering could be performed on the image with same cost and speed as the prior art. The present invention does not provide horizontal overscan compensation or horizontal scaling. However, the present invention may be used in conjunction with horizontal image processing devices or methods.

Filtering digital signals with finite impulse response (FIR) filters is a common practice in digital signal processing, and it is known to those of ordinary skill in the art. An FIR filter can be described by the following transfer function:

$$H^z(z) = b_o + b_1 z^{-1} + \ldots + b_q z^{-q}$$

where $H^z(z)$ denotes the z-transform. The impulse response, h(n), of an FIR is $$h(n) = \begin{cases} b_n & \text{if } 0 \le n \le q \\ 0 & \text{otherwise} \end{cases}$$

There are an infinite number of possible FIRs, each distinguished by the values assigned to the coefficients $b_n$. An FIR with a total of p non-zero coefficients is often referred to as a p-tap filter.

Generally, a higher number of taps allows more complex filtering at the cost of requiring more memory and arithmetic processes. In the context of video image processing, a p-tap vertical filter typically requires p-1 lines of an image to be held in memory. This may be referred to as requiring p-1 line buffers.

The present invention preferably uses an FIR as a flicker filter in situations where high vertical frequency is present in the computer graphics image. One form of such a flicker filter may be a three-tap low pass filter, although, the present invention is not intended to be limited to any particular form of the filter. Low pass filters, as is known to those of ordinary skill in the art, are designed to pass low frequencies and block high frequencies. Such a three-tap filter may take the form:

$$H_1(z) = c_1 + c_2 z^{-1} + c_3 z^{-2}$$

where the coefficients are positive numbers and satisfy the constraint:

$$c_1 + c_2 + c_3 = 1$$

The impulse response $h_1(n)$ of the filter is $$h_1(n) = \begin{cases} c_1 & \text{if } n = 0 \\ c_2 & \text{if } n = 1 \\ c_3 & \text{if } n = 2 \\ 0 & \text{otherwise} \end{cases}$$

For example, an FIR with $c_1 = 1/4$, $c_2 = 1/2$, and $c_3 = 1/4$ is one embodiment of such a three-tap low pass flicker filter. There are many others.

Referring to FIG. 1, a three-tap flicker filter is shown operating on an image. The filter coefficients 10 and 12 operate vertically on horizontal lines of image n−1 through n+2, denoted by reference numbers 14, 16, 18 and 20. Although the filtering is typically performed for each location within a horizontal line, FIG. 1 concentrates on a single horizontal position denoted as x. First, filter coefficients 10 are applied to three vertically adjacent lines of the image, n−1 14, n 16, and n+1 18, to produce filtered line n 22. Next, filter coefficients 12 are applied to lines n 16, n+1 18, and n+2 20, to produce filtered line n+1 24. That is, filter coefficients 10 are "shifted down" one line where they become filter coefficients 12. The three-tap flicker filter uses a weighted average of three vertically adjacent of the unfiltered image to decrease any large differences between adjacent lines. Those of ordinary skill in the art will readily recognize that varying the values of the filter coefficients will vary the amount of smoothing between lines. For example, coefficients $c_1 = 0$, $c_2 = 1$, and $c_3 = 0$ would provide no smoothing.

The embodiment shown in FIG. 1 does not filter horizontally adjacent data, only those at location x. The procedure depicted in FIG. 1 is repeated for each x value in a horizontal line of image data, such as x−1 and x+1.

Other filtering techniques, such as five-tap low pass filters, could also be used to reduce flicker. As discussed above, increasing the complexity of a filter typically requires more memory and processing operations. While increasing the complexity of a filter may well increase the quality of the filtered image, there are typically diminishing returns. In one embodiment of the present invention, a three-tap flicker filter is chosen as a reasonable balance between image quality, memory requirements and processing speed. Those of ordinary skill in the art will readily recognize that such an engineering judgment in selecting a preferred filter size is subject to the current, and expected, costs of memory and processing.

Conversion of an image from noninterlaced to interlaced formats may also be performed with filters such as FIRs. The simplest form of noninterlaced to interlaced conversion would be to skip every other line while creating an interlaced video frame. For example, use odd numbered lines for the first frame and even numbered lines for the second. Of course, more complex conversions are also possible.

Vertical scaling and overscan compensation can be combined with the noninterlaced to interlaced conversion process, using a single filter. This disclosure will use the term scaling filter to describe noninterlaced to interlaced conversion, vertically scaling an image, and vertically compensating for overscan of an image. Such a scaling filter could perform any one, or any combination of two or more of the processes. The scaling filter, however, only operates in the vertical direction on an image. Horizontal scaling, such as compensating for horizontal overscan may be required, but will not be a part of the present invention. The present invention may, however, be adapted to work in conjunction with a horizontal scaling and the present invention is not intended to be limited to images that do not require horizontal scaling.

In one embodiment of the present invention a two-tap FIR scaling filter is used, taking the form:

$$H_2(z) = d_{1,y} + d_{2,y} z^{-2}$$

The impulse response $h_2(n)$, of the filter is $$h_2(n) = \begin{cases} d_{1,y} & \text{if } n = 0 \\ d_{2,y} & \text{if } n = 2 \\ 0 & \text{otherwise} \end{cases}$$

The coefficients include the subscript "y" to denote that they may take on different values, at different y-locations, or different image lines. The coefficients satisfy the constraints:

$$d_{1,y} + d_{2,y} = 1$$

$$d_{2,y} = \text{frac}(\Delta \cdot y + d_0)$$

where $d_o$ is the interpolation initial phase, $\Delta$ is the interpolation increment and y is an output line counter value. The term phase will be further described below. The function frac (x) returns the fractional portion of the argument X. For example, frac (5/4)=0.2.

Figure 2:
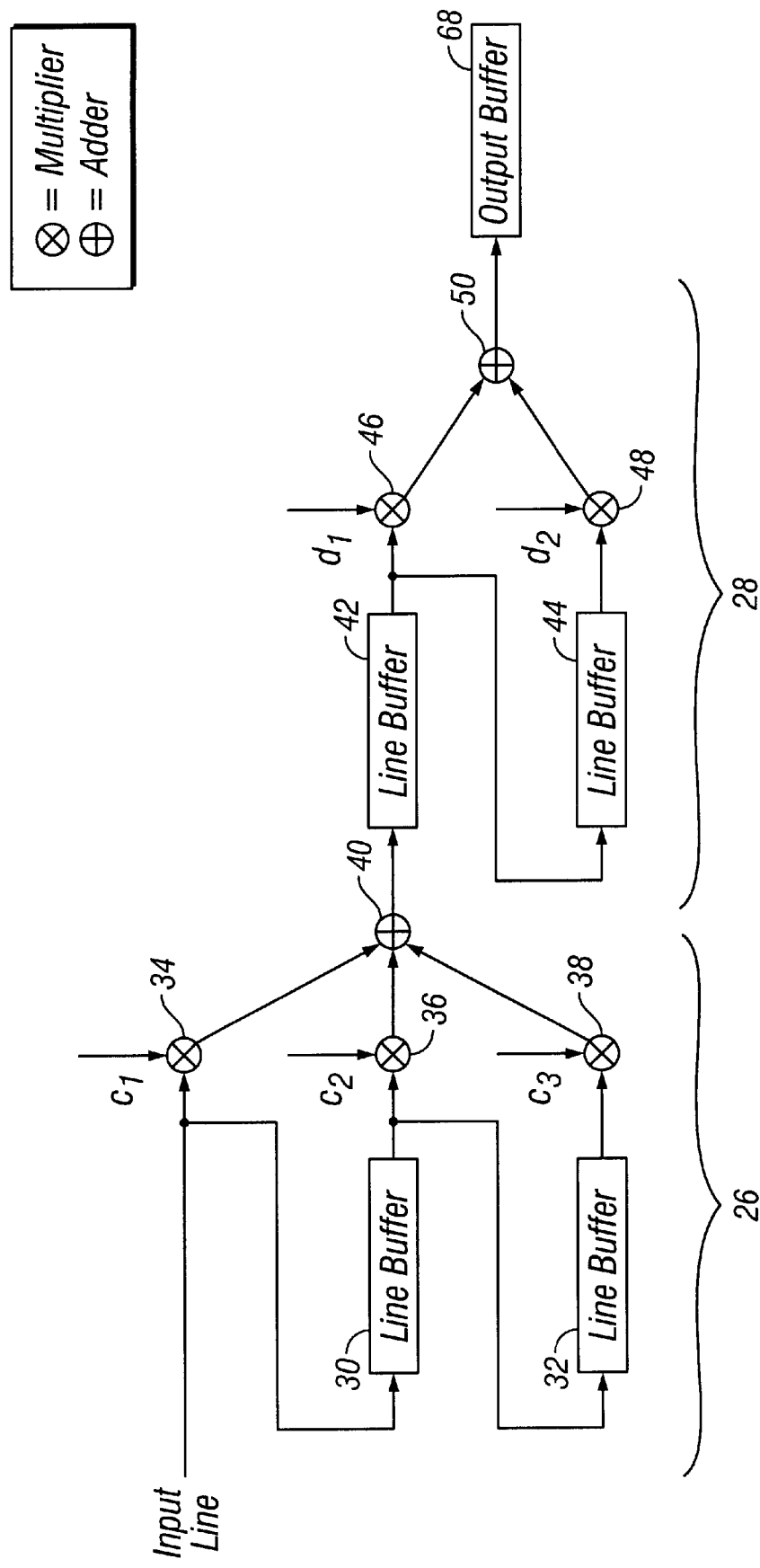
FIG. 2 is a data flow diagram of sequential flicker and scaling filters.

FIG. 2 illustrates a prior art design of sequential flicker 26 and scaling 28 filters. A 3-tap flicker filter 26, with coefficients $c_1$, $c_2$ and $c_3$, is followed by the application of a 2-tap scaling filter with coefficients $d_1$ and $d_2$. Line buffers 30 and 32 provide temporary storage for two lines of video input data; multipliers 34, 36 and 38, along with adder 40, are used to combine the flicker filter coefficients with the video input data. The flicker filtered data is then processed by the scaling filter 28 utilizing line buffers 42 and 44, and multipliers 46 and 48. Temporary values are summed by adder 50 and placed in output line buffer 68, for display.

The present invention combines both the flicker and scaling filters. In one embodiment the resulting 5-tap filter requires only two line buffers, plus an output buffer. Using the above flicker filter $H_1(z)$ and scaling filter $H_2(z)$, the combined filter H(z) is found by the convolution, denoted as *, of $H_1(z)$ and $H_2(z)$.

$$\begin{aligned} H(z) &= H_1(z) * H_2(z) \\ &= (c_1 + c_2 z^{-1} + c_3 z^{-2})(d_{1,y} + d_{2,y} z^{-2}) \\ &= c_1 d_{1,y} + c_2 d_{1,y} z^{-1} + (c_3 d_{1,y} + c_1 d_{2,y}) z^{-2} + c_2 d_{2,y} z^{-3} + c_3 d_{2,y} z^{-4} \\ &= C_1 + C_2 z^{-1} C_3 z^{-2} + C_4 z^{-3} + C_5 z^{-4} \end{aligned}$$

Where the subscript "y" has been dropped for simplicity, although the coefficients can take on different values at different y locations.

Figure 3:
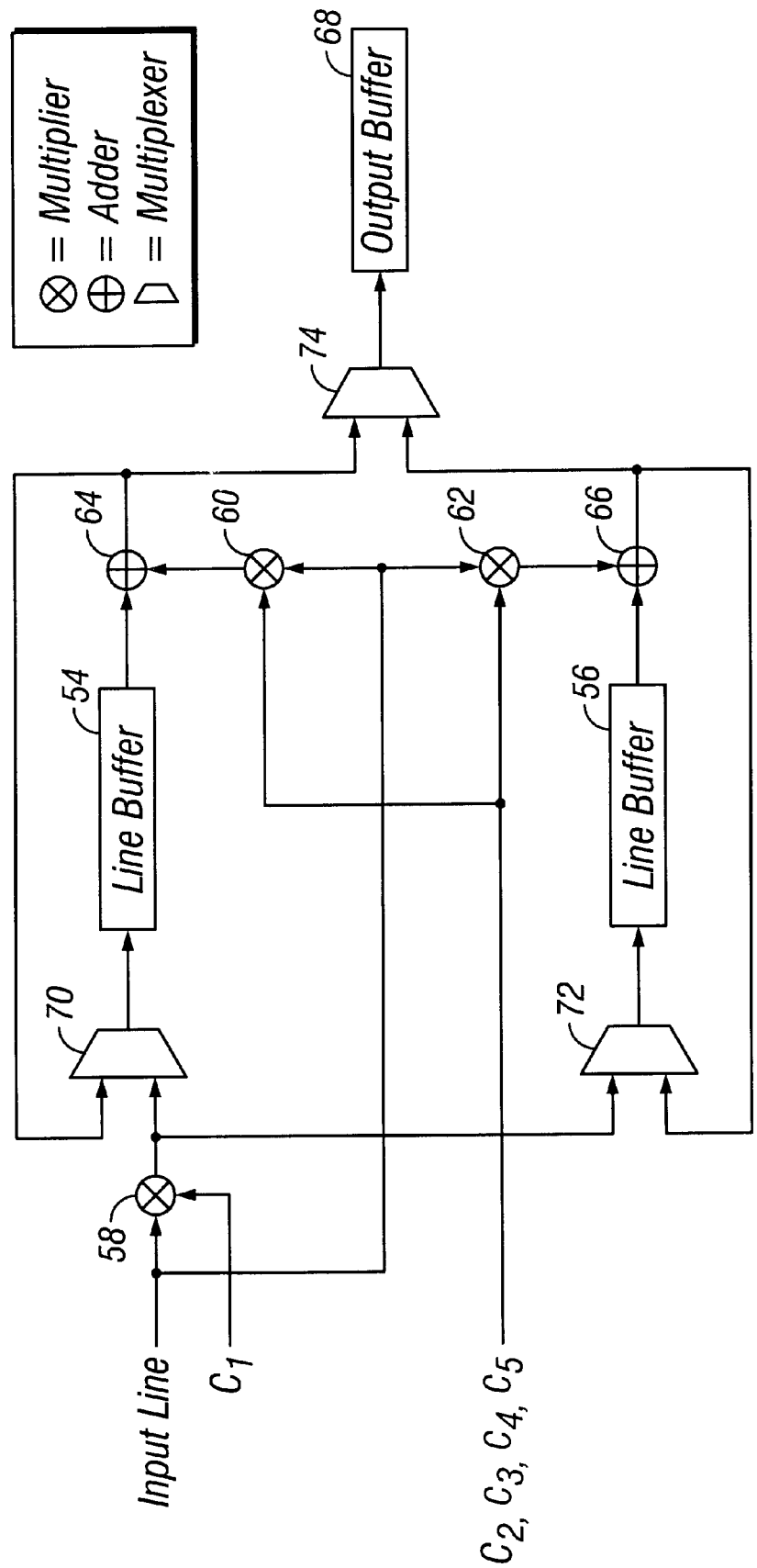
FIG. 3 is a data flow diagram in a combined filter in accordance with one embodiment of the present invention.

A diagram of one embodiment of the present invention, used to implement a combined 5-tap filter, is shown as FIG. 3. This embodiment uses two line buffers, 54 and 56, three multipliers 58, 60 and 62, two adders, 64 and 66, and output buffer 68. Those of ordinary skill in the art will readily recognize that eliminating two line buffers and two multipliers, compared with sequential flicker and scaling filters, results in significant savings in terms of both component cost and processing time. Although multiplexers 70, 72 and 74 are required by the combined filter, these components are relatively inexpensive and do not significantly slow the throughput of the filter.

The present invention, unlike conventional designs, uses line buffers 54 and 56 for temporary storage during filtering. It also exploits the inherent fact that interlaced output occurs at one-half the rate that noninterlaced data is input to efficiently order the processing. Table 2 lists an example of the data in line buffers 54 and 56 and to output buffer 68 with each line of input for the combined filter shown by FIG. 3. Preferably, the calculations are done for an entire horizontal line at one time. In Table 2, $C_1 \times I(n)$ denotes that coefficient $C_1$ is multiplied by the array of values presenting line "n."

TABLE 2

| Input Line | Write to First Line Buffer | Write to Second Line Buffer | Write to Output Line Buffer |
|---|---|---|---|
| 1 | $C_1 \times I(1)$ | | |
| 2 | Above + $C_2 \times I(2)$ | | |
| 3 | Above + $C_3 \times I(3)$ | $C_1 \times I(3)$ | |
| 4 | Above + $C_4 \times I(4)$ | Above + $C_2 \times I(4)$ | |
| 5 | $C_1 \times I(5)$ | Above + $C_3 \times I(5)$ | Line 4, First Line Buffer + $C_5 \times I(5)$ |
| 6 | Above + $C_2 \times I(6)$ | Above + $C_4 \times I(6)$ | |
| 7 | Above + $C_3 \times I(7)$ | $C_1 \times I(7)$ | Line 6, Second Line Buffer + $C_5 \times I(7)$ |
| 8 | Above + $C_4 \times I(8)$ | Above + $C_2 \times I(8)$ | |
| 9 | $C_1 \times I(9)$ | Above + $C_3 \times I(9)$ | Line 8, First Line Buffer + $C_5 \times I(9)$ |

As discussed above, the values of the coefficients may vary with the input line. For example, the value of $C_1$ used with I(1) may not be the same as the value of $C_1$ used with I(9).

Those of ordinary skill in the art will readily recognize that combined flicker and scaling filters need not be limited to 5-taps, such as shown in FIG. 3. However, other embodiments, such as 7-tap combined filters would require minor modifications to the data path of FIG. 3 and the buffer values of Table 2. Such modifications are within the abilities of those of ordinary skill in the art. The present invention is not intended to be limited to any particular size combined filter.

A control scheme is required for a combined filter in order to synchronize the input data stream with the output. For example, noninterlaced to interlaced conversion produces output at one-half the rate of the input. Two other factors also affect the timing of input and output: differences in refresh rate and overscan compensation/scaling. The computer graphic image may have been created for a 75 Hz noninterlaced refresh rate, while the TV format is an interlaced 60 Hz. Similarly, as will be discussed in detail below, overscan compensation/scaling can effect the synchronization between the input and output data.

Many techniques are available for controlling and synchronizing, such as using separate timing generators for input and output, or using a single timing generator for the output and a demand based input stream with a throttling mechanism. The present invention, however, is not intended to be limited to any particular control technique. One embodiment of the present invention uses an output clock and a demand based input stream capable of supplying data at four times the rate of the output clock. As will be seen below, there is a maximum scaling factor (SF) equal to the maximum speed of the input divided by the output clock speed.

$$SF_{max} = \frac{\text{Maximum Input Speed}}{\text{Output Clock Speed}}$$

The clock speed selected for a particular application would preferably be based on the range of anticipated scaling.

Figure 4A:
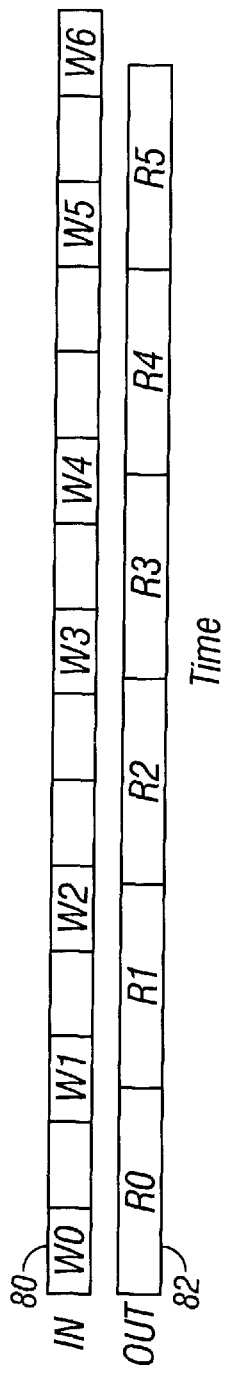
FIGS. 4A–C are timing diagrams of input and output for various scaling ratios.
Figure 4B:
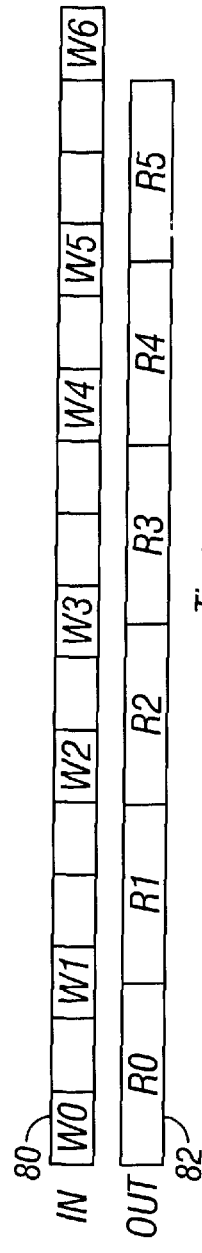
Figure 4C:
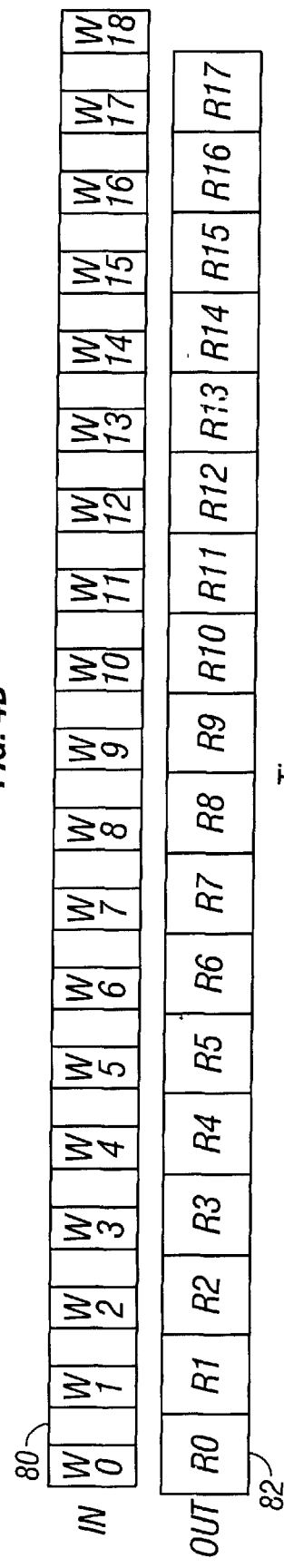

Timing diagrams for various scaling ratios are shown in FIGS. 4A–4C. In each, the input data 80 must be fast enough to "keep up with" the output data 82. Those of ordinary skill in the art will readily recognize that stalling of the input data 80 is one technique that could be used to keep the input data 80 and output date 82 synchronized. Each block of the output data 82 indicates a single line is sent to output buffer 68. Each block of the input data 80 indicates a single line of data is read, a "w" indicates a write to the output buffer.

Overscan compensation and scaling is somewhat similar to noninterlaced to interlaced data conversion. However, unlike noninterlaced to interlaced conversions, there is seldom a 2:1 ratio between the input and output data.

Overscan compensation can be handled in many ways. TV formats typically crop a fixed number of horizontal lines of image data. While this technique is easy to implement, it may not produce satisfactory displays of computer generated graphics. At the other extreme, using an n-tap filter, with n equal to the number of lines in the original image, for overscan compensation is costly. For example, a 1280×1024 resolution computer image would require a 1024-tap filter. The processing required for such a filter would be extremely difficult to accomplish in real time for a reasonable price.

One embodiment of the present invention uses a 5-tap filter for the combined flicker and overscan compensation filter. Other size filters could be used, and the present invention is not intended to be limited to any particular combined filter.

Those of ordinary skill in the art will readily recognize that vertically scaling a computer image is conceptually very similar to vertical overscan compensation. In both operations, X lines of input are converting to Y lines of output. The principal difference is that ratio of X to Y in scaling may well exceed the 1.10 to 1.20 range typical in overscan compensation.

Because scaling factors (SF) are not always integers, the concept of a "phase" is used to filter the input data and create output data. The phase is used to track a fractional position while mapping the input lines to the output lines. One embodiment of the present invention uses 16 phases, represented as 4 bits, when scaling. That is, non-integer mapping between input and output lines has an effective resolution of 1/16 the distance between input lines. Filter coefficients C1 through C5 may change depending on the particular input line number. With 16 phases, there are 16 sets of filter coefficients. With a 5-tap filter, 5×16 phase gives a total of 80 coefficients. Because of symmetry, only 9 sets of coefficients are unique and are stored. The present invention is not intended to be limited to any particular number of phases, or sets of filter coefficients.

One embodiment of the present invention uses a digital differential analyzer (DDA) to determine which lines of input to use in the filter function for a particular line of output. The DDA is a counter that increments for every output line. The DDA indicates which input lines and filter phase to use. The DDA makes the following calculation:

$$\text{Input Pos} = \text{Init Phase} + \sum_{i=1}^{n} SF$$

Where InputPos is the input line position, with the integer portion representing the input line number and the fractional portion the filter phase. InitPhase is the initial phase. SF is the scale factor, the number of input lines divided by the number of output lines in a field. The variable n represents the current output line being produced. Odd and even output fields have differing initial phases. For even numbered output fields, the initial phase is adjusted by adding 0.5 times SF to the initial phase for odd output fields.

Figure 5:
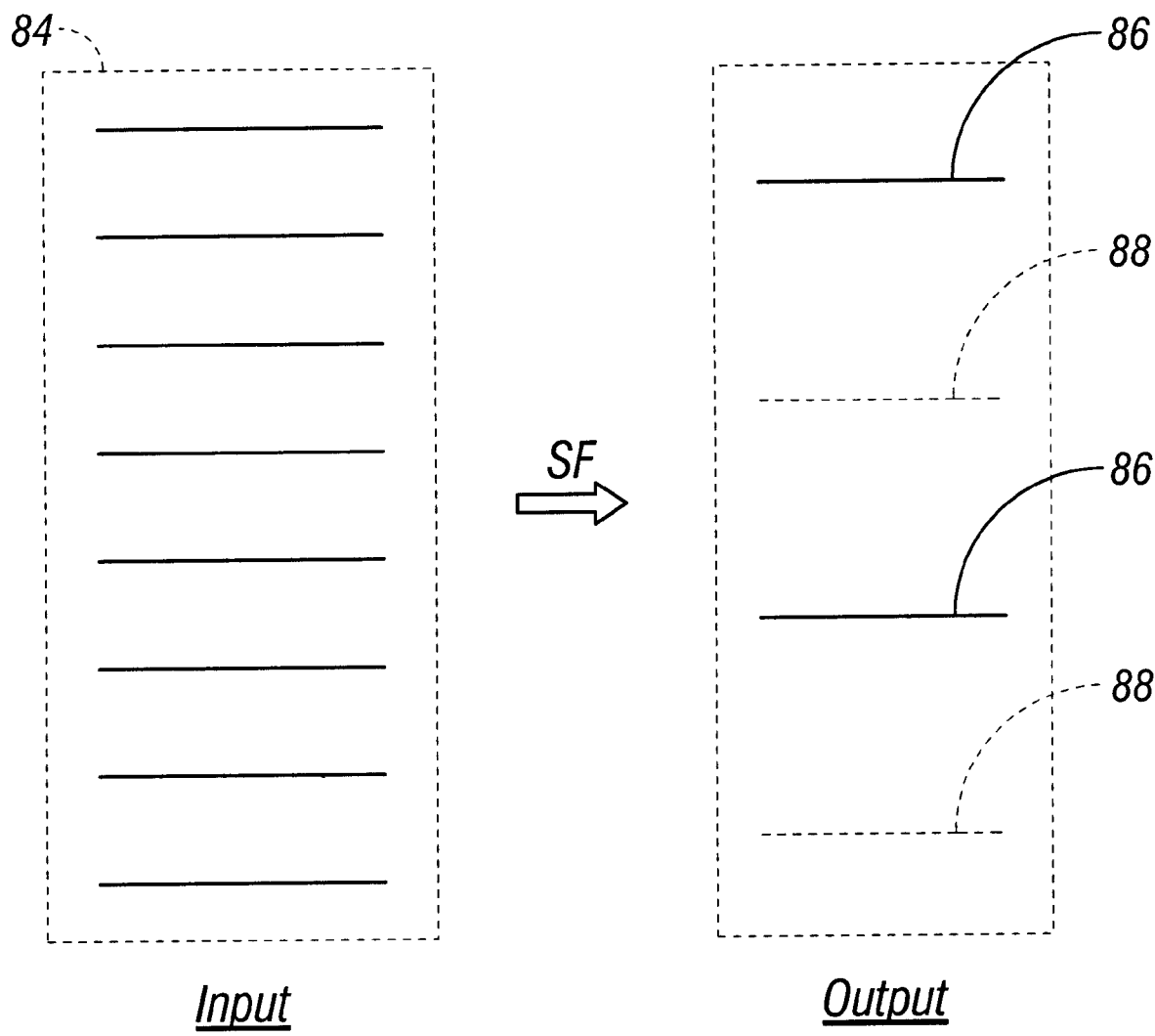
FIG. 5 depicts scaling a noninterlaced input image and creating two scaled interlaced output frames.

FIG. 5 depicts a mapping from a noninterlaced input frame 84 to two interlaced output frames 86 and 88 using a 5-tap filter.

The first output frame, or the "odd field", is shown with solid lines 86. The even field is shown as broken lines 88.

In mapping from the input frame space to the output frame space, the distance between lines is scaled by SF/2. In the input frame, the initial line can be thought of being offset from the top of the frame by ½ line. In the output frame, this distance from the initial line to the top of the frame is scaled, and becomes ½ * SF/2=SF/4. If the first input line is at location 0, the top of the image starts at −0.5. So the initial output line is at SF/4−0.5. This is the initial phase for an odd output field. The initial phase for an even output field is (SF/4−0.5)+0.5 * SF, which is equal to 3 * SF/4−0.5.

Processing the input image with a 5-tap filter requires some adjustment at the top and bottom lines of the image. In accordance with one embodiment of the present invention, the top line is effectively duplicated and the filter coefficients are applied to the duplicate lines. That is, $(c_1+c_2+c_3)$ is multiplied by I(1). Other "missing lines" are processed in a similar fashion. The present invention is not, however, intended to be limited to any particular method of filtering the boundaries of an image.

As will be readily recognized by those of ordinary skill in the art, the combined filter must be separately applied to each component of a video image, such as the three components of a color image. The present invention, however, may be used with any colorspace format, such as RGB or YUV, without modification.

Those of ordinary skill in the art will readily recognize that faster clock speeds will allow more "hardware efficient" embodiments of the present invention. For example, a single adder and a single multiplier could process the data flow of the embodiment of the present invention shown in FIG. 3, if the clock speed were fast enough. The present invention is not, however, intended to be limited to any particular clock speed or processor configuration.

While embodiments and applications of this invention have been shown and described, it would be apparent to those skilled in the art that many more modifications than mentioned above are possible without departing from the inventive concepts herein after a review of this disclosure. The invention, therefore, is not to be restricted except in the spirit of the appended claims.

What is claimed is:

1. A non-sequential combined flicker-scaling filter apparatus for producing a TV formatted image, comprising:

an input data reader for reading image data from an input image;

a filter coefficient generator for supplying a set of filter coefficients responsive to said input image; and a non-sequential flicker-scaling engine for simultaneously applying flicker reduction to said input image and vertically scaling said input image by combining said input image and said filter coefficients to produce an interlaced and filtered display image, wherein said flicker-scaling engine uses at least a four tap filter.

2. A combined flicker-scaling filter apparatus in accordance with claim 1, wherein:

said flicker-scaling engine uses a 5 tap filter.

3. A combined flicker-scaling filter apparatus in accordance with claim 1, wherein:

said flicker-scaling engine uses not more than two line buffers and one output buffer.

4. A combined flicker-scaling filter apparatus in accordance with claim 1, wherein:

said flicker-scaling engine uses not more than three multipliers.

5. A combined flicker-scaling filter apparatus in accordance with claim 1, wherein:

said flicker-scaling engine uses not more than two adders.

6. A combined flicker-scaling filter apparatus in accordance with claim 1, wherein:

said flicker-scaling engine uses not more than three multipliers and uses not more than two adders.

7. A combined flicker-scaling filter apparatus in accordance with claim 1, wherein:

said filter coefficient generator supplies one of nine sets of filter coefficients responsive to a phase.

8. A combined flicker-scaling filter apparatus in accordance with claim 1, further comprising:

a timing generator for controlling the speed of said flicker-scaling engine for producing said interlaced and filtered display image.

9. A combined flicker-scaling filter apparatus in accordance with claim 8, wherein:

said input data reader is adapted to read image data faster than is required by said timing generator and said flicker-scaling engine.

10. A combined flicker-scaling filter apparatus in accordance with claim 1, wherein:

said flicker-scaling engine vertically scales said input image by a scale factor to interlace said input image.

11. A combined flicker-scaling filter apparatus in accordance with claim 1, wherein:

said flicker-scaling engine vertically scale said input image by a scale factor both to interlace said input image and to display all of said input image within the TV formatted image.

12. A combined flicker-scaling filter apparatus in accordance with claim 11, further comprising:

a timing generator for generating an input clock signal and an output clock signal, said input clock signal for controlling the speed of the input data reader, said output clock signal for controlling the speed of said flicker-scaling engine for producing said interlaced and filter display image.

13. A method for producing a TV formatted image, comprising:

reading lines of an input image;

filtering lines of said input image simultaneously for flicker reduction and vertical scaling with a non-sequential combined filter; and creating an interlaced and filtered display image, wherein filtering is performed using at least a four tap filter.

14. A method in accordance with claim 13, wherein:

filtering is performed using a 5 tap filter.

15. A method in accordance with claim 13, wherein:

filtering is performed using not more than two line buffers and one output buffer.

16. A method in accordance with claim 13, wherein:

filtering is performed with not more than three simultaneous multiplications.

17. A method in accordance with claim 13, wherein:

filtering is performed with not more than two simultaneous additions.

18. A method in accordance with claim 13, wherein:

filtering is performed with not more than three simultaneous multiplications and not more than two simultaneous additions.

19. A method in accordance with claim 13, further comprising:

selecting one of nine sets of filter coefficients for said combined filter based on a phase.

20. A method in accordance with claim 13, wherein:

creating said interlaced and filtered display image is controlled by a timing generator.

21. A method in accordance with claim 20, wherein:

reading lines of said input image is at a rate faster than is required for creating said interlaced and filtered display image as controlled by said timing generator.

22. A method in accordance with claim 13, wherein:

creating said interlaced and filtered display image is performed by vertically scaling said input image by a scale factor.

23. A method in accordance with claim 22, wherein:

vertically scaling said input image by a scale factor both creates an interlaced display image and re-sizes said input image to fit within the TV formatted display image.

24. A program storage device readable by a machine, tangibly embodying a program of instructions executable by the machine to perform a method for producing a TV formatting image, the method comprising:

reading lines of an input image;

filtering lines of said input image simultaneously for flicker reduction and vertical scaling with a non-sequential combined filter; and creating an interlaced and filtered display image, wherein filtering is performed using at least a four tap filter.

25. A combined flicker-scaling filter apparatus for producing a TV formatted image, comprising:

a first multiplier having a first input connected to an input node, a second input connected to a first coefficient node, and an output;

a second multiplier having a first input connected to the input node, a second input connected to a second coefficient node, and an output;

a third multiplier having a first input connected to the input node, a second input connected to the second coefficient node, and an output;

a first adder having a first input connected to the output of the second multiplier, a second input, and an output;

a second adder having a first input connected to the output of the third multiplier, a second input, and an output;

a first multiplexer having at least one input connected to the output of the first multiplier, at least one input connected to the output of the first adder, and an output;

a second multiplexer having at least one input connected to the output of the first multiplier, at least one input connected to the output of the second adder, and an output;

a first line buffer having an input connected to the output of the first multiplexer and an output connected to the second input of the first adder;

a second line buffer having an input connected to the output of the second multiplexer and an output connected to the second input of the second adder;

a third multiplexer having at least one input connected to the output of the first adder, at least one input connected to the output of the second adder, and an output; and an output buffer having an input connected to the output of the third multiplexer and an output connected to an output node.

* * * * *

UNITED STATES PATENT AND TRADEMARK OFFICE
CERTIFICATE OF CORRECTION

PATENT NO.    : 6,563,544 B1
DATED         : May 13, 2003
INVENTOR(S)   : Maximino Vasquez It is certified that error appears in the above-identified patent and that said Letters Patent is hereby corrected as shown below:

Column 5,
Line 19, replace "$d_{1,y} + d_{2,y} - 1$" with -- $d_{1,y} + d_{2,y} = 1$ --.

Column 6,
Line 10, replace "presenting" with -- representing --.

Signed and Sealed this

Second Day of December, 2003

JAMES E. ROGAN
*Director of the United States Patent and Trademark Office*